United States Patent
Ha et al.

(10) Patent No.: US 10,217,273 B2
(45) Date of Patent: Feb. 26, 2019

(54) IMAGE PROCESSING APPARATUS AND METHOD

(71) Applicant: SAMSUNG ELECTRONICS CO., LTD., Suwon-si (KR)

(72) Inventors: Inwoo Ha, Yongin-si (KR); Seungin Park, Yongin-si (KR); Minsu Ahn, Seoul (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 14/945,694

(22) Filed: Nov. 19, 2015

(65) Prior Publication Data
US 2016/0148420 A1     May 26, 2016

(30) Foreign Application Priority Data
Nov. 20, 2014   (KR) .................. 10-2014-0162652

(51) Int. Cl.
G06T 15/00  (2011.01)
G06T 15/80  (2011.01)
G06T 15/50  (2011.01)

(52) U.S. Cl.
CPC ............ *G06T 15/80* (2013.01); *G06T 15/005* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 6,064,393 A * | 5/2000 | Lengyel | G06T 15/005 345/419 |
| 7,061,489 B2 | 1/2006 | Snyder et al. | |
| 7,167,176 B2 | 1/2007 | Sloan et al. | |
| 7,633,503 B2 | 12/2009 | Snyder et al. | |

(Continued)

FOREIGN PATENT DOCUMENTS

| JP | 2009-1636588 A | 7/2009 |
|---|---|---|
| KR | 10-2004-0036722 A | 4/2004 |

(Continued)

OTHER PUBLICATIONS

Kircher, Scott, and Alan Lawrance. "Inferred lighting: fast dynamic lighting and shadows for opaque and translucent objects." Proceedings of the 2009 ACM SIGGRAPH Symposium on Video Games. ACM, 2009.*

(Continued)

*Primary Examiner* — Said Broome
(74) *Attorney, Agent, or Firm* — NSIP Law

(57) ABSTRACT

An image processing apparatus includes a first shader configured to perform a light shading operation associated with at least one light source on a three-dimensional (3D) model at a first resolution to obtain a light shading result of the first resolution; a second shader configured to perform a surface shading operation on the 3D model at a second resolution different from the first resolution to obtain a surface shading result of the second resolution; and a processor configured to generate a rendering result by combining the light shading result of the first resolution with the surface shading result of the second resolution.

25 Claims, 11 Drawing Sheets

(56) References Cited

U.S. PATENT DOCUMENTS

| | | | |
|---|---|---|---|
| 7,768,523 | B2 | 8/2010 | Baker et al. |
| 8,217,970 | B2 | 7/2012 | Whitehead et al. |
| 8,599,313 | B2 | 12/2013 | Barenbrug et al. |
| 8,644,596 | B1 * | 2/2014 | Wu .................... G06K 9/00201 382/154 |
| 9,881,411 | B2 * | 1/2018 | Monson .................. G06T 15/06 |
| 2004/0143786 | A1 | 7/2004 | Stauder et al. |
| 2011/0032256 | A1 | 2/2011 | Ha |
| 2013/0002671 | A1 | 1/2013 | Armsden et al. |
| 2014/0035900 | A1 | 6/2014 | Slavin, III et al. |
| 2017/0116708 | A1 * | 4/2017 | Imber .................. G06T 3/4007 |

FOREIGN PATENT DOCUMENTS

| | | |
|---|---|---|
| KR | 10-0949859 B1 | 3/2010 |
| KR | 10-2010-0062860 A | 6/2010 |
| KR | 10-1334187 B1 | 12/2013 |

OTHER PUBLICATIONS

Tripathi, Avanish, and Mark Claypool. "Improving multimedia streaming with content-aware video scaling." (2001).*

Li, Tzu-Mao, Yu-Ting Wu, and Yung-Yu Chuang. "Sure-based optimization for adaptive sampling and reconstruction." ACM Transactions on Graphics (TOG) 31.6 (2012): 194.*

Myszkowski, Karol, et al. "Perception-guided global illumination solution for animation rendering." Proceedings of the 28th annual conference on Computer graphics and interactive techniques. ACM, 2001.*

Scherzer, Daniel, et al. "Temporal Coherence Methods in Real-Time Rendering." Computer Graphics Forum. vol. 31. No. 8. Blackwell Publishing Ltd, 2012.*

B. Segovia, et al., "Non-Interleaved Deferred Shading of Interleaved Sample Patterns," *Proceedings of the 21st ACM SIGGRAPH/ Eurographics Symposium on Graphics Hardware*, Vienna, AT, 2006, vol. 3. No. 04 (9 pages in English).

S. Kircher et al., "Inferred Lighting: Fast dynamic lighting and shadows for opaque and translucent objects," *Proceedings of the 2009 ACM SIGGRAPH Symposium on Video Games*, ACM, New Orleans, LA, 2009, pp. 39-45.

G. Nichols et al., "Interactive Indirect Illumination Using Adaptive Multiresolution Splatting," *IEEE Transactions on Visualization and Computer Graphics*, Sep. 2010, vol. 16, No. 5, pp. 729-741.

O. Klehm, "Masters Thesis IT-Systems Engineering Interactive Massive Lighting for Virtual 3D City Models", *Hasso-Plattner-Institut Potsdam*, Potsdam, DE, Oct. 2010 (85 Pages In English).

M. Ahn, et al., "Real-time global illumination on mobile device," *International Society for Optics and Photonics SPIE-IS&T Electronic Imaging*, Feb. 2014, vol. 9030, pp. 903005-1-903005-5.

Partial European Search Report dated Mar. 16, 2016 in counterpart European Application No. 15195546.5 (10 pages in English).

C. Chevrier. "A View Interpolation Technique Taking Into Account Diffuse and Specular Inter-Reflections." *The Visual Computer*, vol. 13, No. 7, 1997, pp. 330-341.

K. Myszkowski, et al. "Perception-Guided Global Illumination Solution for Animation Rendering." *Proceedings of the 28th annual conference on Computer graphics and interactive techniques*, Los Angeles, CA, Aug. 12-17, 2001, pp. 221-230.

A. Tripathi, et al. "Improving Multimedia Streaming with Content-Aware Video Scaling.", Retrieved from: http://digitalcommons.wpi.edu/computerscience-pubs/96, Worcester Polytechnic Institute, 2001. (17 pages in English).

G. Ellis, et al. "The Effect of Translational Ego-Motion on the Perception of High Fidelity Animations." ACM *Proceedings of the 22nd Spring Conference on Computer Graphics.*, Apr. 20-22, 2006, pp. 75-82.

R. Cochran, et al. "Second-Order Illumination in Real-Time" *Proceedings of the 45th ACM Southeast conference*, N. Carolina, Mar. 23-24, 2007, pp. 13-18.

K. Claypool, et al. "The Effects of Resolution on Users Playing First Person Shooter Games." *Proceedings of SPIE-IS&T Electronic Imaging*, vol. 6504, 2007. pp. 65040B-1-65040B-12.

T. Ritschel, et al. "Imperfect Shadow Maps for Efficient Computation of Indirect Illumination." *Papers on ACM SIGGRAPH AIA 2008*, New York, NY, Dec. 1, 2008, (8 pages in English).

D. Scherzer, et al. "Temporal Coherence Methods in Real-Time Rendering." *Computer Graphics Forum*, vol. 31, No. 8, Jan. 2012. pp. 2378-2408.

M. Steinberger, et al. "Ray Prioritization Using Stylization and Visual Saliency." *Computers & Graphics* vol. 36, No. 6, Mar. 2012, pp. 673-684.

Extended European Search Report dated Aug. 1, 2016 in counterpart European Application No. 15195546.5 (29 pages in English).

* cited by examiner

IMAGE PROCESSING APPARATUS AND METHOD

CROSS-REFERENCE TO RELATED APPLICATION(S)

This application claims the benefit under 35 USC 119(a) of Korean Patent Application No. 10-2014-0162652 filed on Nov. 20, 2014, in the Korean Intellectual Property Office, the entire disclosure of which is incorporated herein by reference for all purposes.

BACKGROUND

1. Field

The following description relates to a rendering field that provides global illumination effects or indirect illumination effects.

2. Description of Related Art

In various fields, for example, three-dimensional (3D) games, virtual reality animations, and movies, an interest in real-time rendering for a 3D model is increasing. When a 3D scene is rendered using global illumination technology, virtual point lights (VPLs) that represent indirect illumination effects, for example, diffraction and reflection of light in an image space, are sampled. In some cases, a number of such VPLs are sampled, and thus a computational complexity for a visibility check and shading in a rendering process increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus includes a first shader configured to perform a light shading operation associated with at least one light source on a three-dimensional (3D) model at a first resolution to obtain a light shading result of the first resolution; a second shader configured to perform a surface shading operation on the 3D model at a second resolution different from the first resolution to obtain a surface shading result of the second resolution; and a processor configured to generate a rendering result by combining the light shading result of the first resolution with the surface shading result of the second resolution.

The first resolution may be lower than the second resolution.

The processor may be further configured to upscale the light shading result of the first resolution to have a resolution equal to the second resolution to obtain an upscaled light shading result, and generate the rendering result by combining the upscaled light shading result with the surface shading result.

The surface shading result of the second resolution may correspond to an interlaced frame constituted by two field; the light shading result of the first resolution may correspond to one of the two fields of the interlaced frame; and the first resolution may be half of the second resolution.

The first shader may be further configured to decrease the first resolution in a dynamic scene more than in a static scene.

The first shader may be further configured to decrease the first resolution in a scene with a relatively high brightness more than in a scene with a relatively low brightness.

The first shader may be further configured to consider indirect lights in performing the light shading operation, and decrease the first resolution as a number of indirect lights considered in the light shading operation increases.

In another general aspect, an image processing apparatus includes a first shader configured to perform a light shading operation associated with at least one light source on a three-dimensional (3D) model in a plurality of frames including a first frame to obtain light shading results of the plurality of frames; a second shader configured to perform a surface shading operation on the 3D model in the first frame to obtain a surface shading result of the first frame; and a processor configured to combine the light shading results of the plurality of frames to obtain a combined light shading result, and generate a rendering result by combining the combined light shading result with the surface shading result of the first frame.

The apparatus may further include a buffer configured to buffer light shading results of a predetermined number of frames preceding the first frame, and provide the buffered light shading results to the processor; and the processor may be further configured to combine the buffered light shading results with a light shading result of the first frame to obtain the combined light shading result.

The processor may be further configured to interpolate or extrapolate the buffered light shading results in obtaining the combined light shading result.

The first shader may be further configured to perform the light shading operation at a first resolution; and the second shader may be further configured to perform the surface shading operation at a second resolution different from the first resolution.

The first resolution may be lower than the second resolution.

The processor may be further configured to calculate a weighted sum of the light shading results of the plurality of frames to obtain the combined light shading result.

In another general aspect, an image processing apparatus includes a first shader configured to perform a light shading operation associated with at least one light source on a three-dimensional (3D) model in at least one frame preceding a first frame to obtain a light shading result for the at least one frame; a second shader configured to perform a surface shading operation on the 3D model in the first frame to obtain a surface shading result for the first frame; and a processor configured to generate a rendering result for the first frame by combining the light shading result for the at least one frame with the surface shading result for the first frame.

The first shader may be further configured to perform the light shading operation once in every two frames.

The first shader may be further configured to perform the light shading operation at a first resolution; and the second shader may be further configured to perform the surface shading operation at a second resolution different from the first resolution.

The first shader may be further configured to group pixels of each frame into groups of pixels, and perform the light shading operation for the pixels in each of the groups sequentially in successive frames so that the light shading operation is performed for a different one of the pixels in each of the groups in each of the successive frames.

The first shader may be further configured to reuse a light shading result of a previous frame for each pixel in each of the groups for which the light shading operation is not performed in each of the successive frames.

In another general aspect, a image processing apparatus includes a first shader configured to perform a light shading operation on a three-dimensional (3D) model in a plurality of frames by grouping pixels of each frame into groups of pixels, performing the light shading operation for the pixels in each of the groups sequentially in successive frames so that the light shading operation is performed for a different one of the pixels in each of the groups in each of the successive frames, and reusing a light shading result of a previous frame for each pixel in each of the groups for which the light shading operation is not performed in each of the successive frames to obtain a light shading result; a second shader configured to perform a surface shading operation on the 3D model in each frame to obtain a surface shading result; and a processor configured to generate a rendering result by combining the light shading result with the surface shading result.

In another general aspect, a image processing method of an image processing apparatus including at least one processor includes performing, using the at least one processor, a light shading operation associated with at least one light source on a three-dimensional (3D) model at a first resolution to obtain a light shading result of the first resolution; performing, using the at least processor, a surface shading operation on the 3D model at a second resolution higher than the first resolution to obtain a surface shading result of the second resolution; and generating, using the at least one processor, a rendering result by combining the light shading result of the first resolution with the surface shading result of the second resolution.

The method may further include adjusting the light shading result of the first resolution to have a resolution equal to the second resolution to obtain an adjusted light shading result; and the generating may further include generating the rendering result by combining the adjusted light shading result with the surface shading result.

The method may further include analyzing a characteristic of a scene to be rendered; and adaptively adjusting the first resolution based on the analyzed characteristic of the scene.

The characteristic of the scene may be an inter-frame difference; and the adjusting may further include decreasing the first resolution in a dynamic scene more than in a static scene based on the analyzed inter-frame difference.

The characteristic of the scene may be a scene brightness; and the adjusting may further include decreasing the first resolution in a scene with a relatively high brightness more than in a scene with a relatively low brightness based on the analyzed scene brightness.

The performing may further include considering indirect lights in performing the light shading operation; the characteristic of the scene may be a number of indirect lights considered in performing the light shading operation; and the adjusting may further include decreasing the first resolution as the number of indirect lights considered in the light shading operation increases based on the analyzed number of indirect lights.

In another general aspect, a non-transitory computer-readable storage medium stores instructions to cause computing hardware to perform an image processing method including performing a light shading operation associated with at least one light source on a three-dimensional (3D) model at a first resolution to obtain a light shading result of the first resolution; performing a surface shading operation on the 3D model at a second resolution different from the first resolution to obtain a surface shading result of the second resolution; and generating a rendering result by combining the light shading result of the first resolution with the surface shading result of the second resolution.

In another general aspect, an image processing apparatus includes a first shader configured to perform a light shading operation on a three-dimensional (3D) model to obtain a light shading result having a first characteristic; a second shader configured to perform a surface shading operation on the 3D model to obtain a surface shading result having a second characteristic that is a same kind of characteristic as the first characteristic but is different in quantity; and a processor configured to generate a rendering result by combining the light shading result with the surface shading result.

An amount of computing resources needed by the first shader to perform the light shading operation to obtain the light shading result having the first characteristic may be less than an amount of computing resources that would be needed by the first shader to perform the light shading operation to obtain a light shading result having the second characteristic.

The first characteristic may be a first resolution, and the second characteristic may be a second resolution greater than the first resolution.

The first characteristic may be a first frame rate, and the second characteristic may be a second frame rate greater than the first frame rate.

The first shader may be further configured to perform the light shading operation once in every N frames (N≥2), and reuse a previous light shading result in each of the N frames in which the light shading operation is not performed; and the second shader may be further configured to perform the surface shading operation in each of the N frames.

The first characteristic may be a first pixel update rate, and the second characteristic may be a second pixel update rate greater than the first pixel update rate.

The first shader may be further configured to group pixels of each frame into groups of pixels each containing N pixels (N≥2), perform the light shading operation once in every N frames for each of the pixels in each of the groups so that the light shading operation is performed for a different one of the N pixels in each of the N frames, and reuse a light shading result of a previous frame for each pixel in each of the groups for which the light shading operation is not performed in each of the N frames; and the second shader may be further configured to perform the surface shading operation for each pixel in each of the N frames.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terms used herein are mainly selected from general terms currently being used in light of the features described in this application. However, other terms may be used based on development and/or changes in technology, custom, or a preference of an operator. Thus, it should be understood that the terms used herein are terms merely used to describe the examples, rather than terms intended to limit the spirit of this disclosure.

In addition, in a specific case, most appropriate terms have been arbitrarily selected by the applicant for ease of description and/or for ease of understanding. In this instance, the meanings of the arbitrarily used terms will be clearly explained in the corresponding description. Hence, the terms should be understood not by the simple names of the terms, but by the meanings of the terms and the following overall description of this specification.

Figure 1:
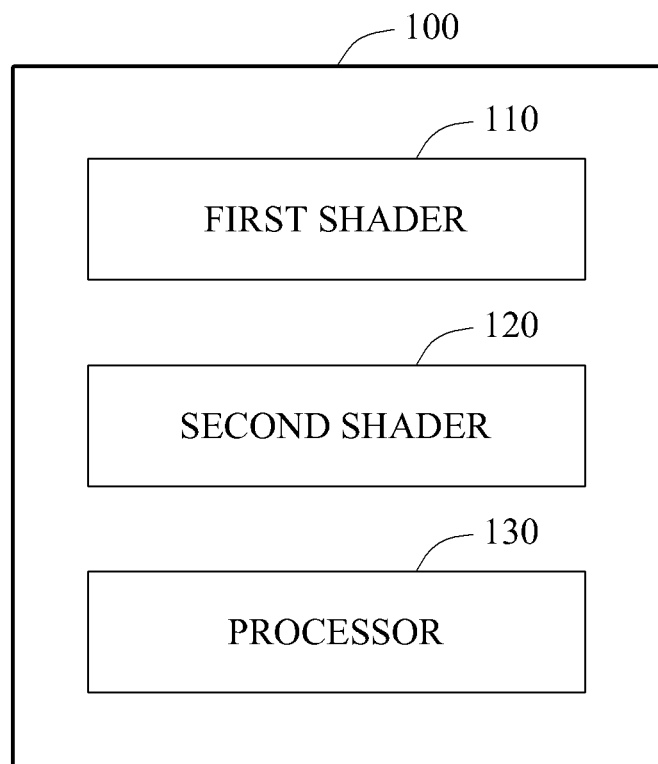
FIG. 1 is a block diagram illustrating an example of an image processing apparatus.

FIG. 1 is a block diagram illustrating an example of an image processing apparatus.

Referring to FIG. 1, an image processing apparatus 100 performs global illumination rendering on a three-dimensional (3D) model. The image processing apparatus 100 may be implemented by at least a portion of one or more graphics processing units (GPUs). The image processing apparatus 100 includes a first shader 110, a second shader 120, and a processor 130. The first shader 110 performs light shading to calculate color value shading of a direct light and an indirect light with respect to the 3D model. The light shading is a process of checking a visibility of a scene based on a color, a brightness, and a direction of a direct or indirect light and rendering the scene. The second shader 120 performs surface shading. The surface shading is a process of rendering a scene based on a surface normal, and a texture color of a surface of an object. By combining a light shading result with a surface shading result, for example, by multiplying the light shading result by the surface shading result, the processor 130 generates a rendering result image with respect to the scene.

The first shader 110 and the second shader 120 perform shading at different resolutions. When light-surface shading is performed by an existing GPU, light shading and surface shading are performed at the same resolution. In this example, based on a resolution of an image to be output by the GPU, an input resolution to be provided to a shader in a case similar to deferred rendering and a shader processing resolution are set to be equal. Light shading may require an operation, for example, a visibility test on a number of indirect lights, for example, virtual point lights (VPLs). Thus, a computational complexity may be relatively high. Light has smooth and diffusive effects in a space. Accordingly, although a light shading resolution decreases to an extent, the overall rendering quality is not greatly affected. The image processing apparatus 100 sets a light shading resolution and a surface shading resolution differently and processes light shading and surface shading based on respective optimal resolutions, thereby efficiently using computing resources. That is, an amount of computing resources needed to perform the light shading operation at the reduced resolution will be less than an amount of computing resources needed to perform the light shading operation at the full resolution.

In one example, the first shader 110 performs light shading at a first resolution. The second shader 120 performs surface shading at a second resolution. The second resolution may be equal to an output resolution of the GPU, or may be different from the output resolution. As described above, the first resolution associated with light shading is lower than the second resolution associated with surface shading. For example, the first resolution may be a half resolution or a quarter resolution of the second resolution. The processor 130 renders a resulting image by upscaling a light shading result generated at the lower resolution based on the surface resolution.

A ratio of the first resolution to the second resolution may change over time. For example, the ratio of the first resolution to the second resolution may adaptively change based on a scene characteristic. Examples of the scene characteristic include an inter-frame difference, a scene brightness of a scene being rendered, and a number of indirect lights reflected in rendering a scene. An inter-frame difference is a difference between one frame of a scene and a previous frame of the scene. If there is no difference between the two frames of the scene, the scene is a static scene. If there is a difference between the two frames of the scene, the scene is a dynamic scene. The greater the difference between the two frames, the more dynamic the scene is. In detail, the first shader 110 decreases the first resolution in a dynamic scene more than in a static scene. The more dynamic the scene is, that is the greater the inter-frame difference is, the more the first shader 110 may decrease the first resolution. In the dynamic scene, rapid operation processing is more important than a quality of rendering. The first shader 110 decreases the light shading resolution in a brighter scene more than in a darker scene based on an overall brightness or luminance of a scene to be rendered. This is because a human eye recognizes a difference in brightness with a higher sensitivity in a relatively dark environment than in a relatively bright environment. Further, as a number of indirect lights reflected in rendering a scene increases, the first shader 110 decreases the first resolution. This is because performing full-resolution light shading on a number of VPLs causes an increase in computing resources because when there are a number of indirect lights, for example, VPLs, a great computational complexity for a light shading operation is required. Thus, by decreasing the light shading resolution in a frame scene in which a number of VPLs are sampled, an increase in a number of computing resources may be prevented.

Figure 2:
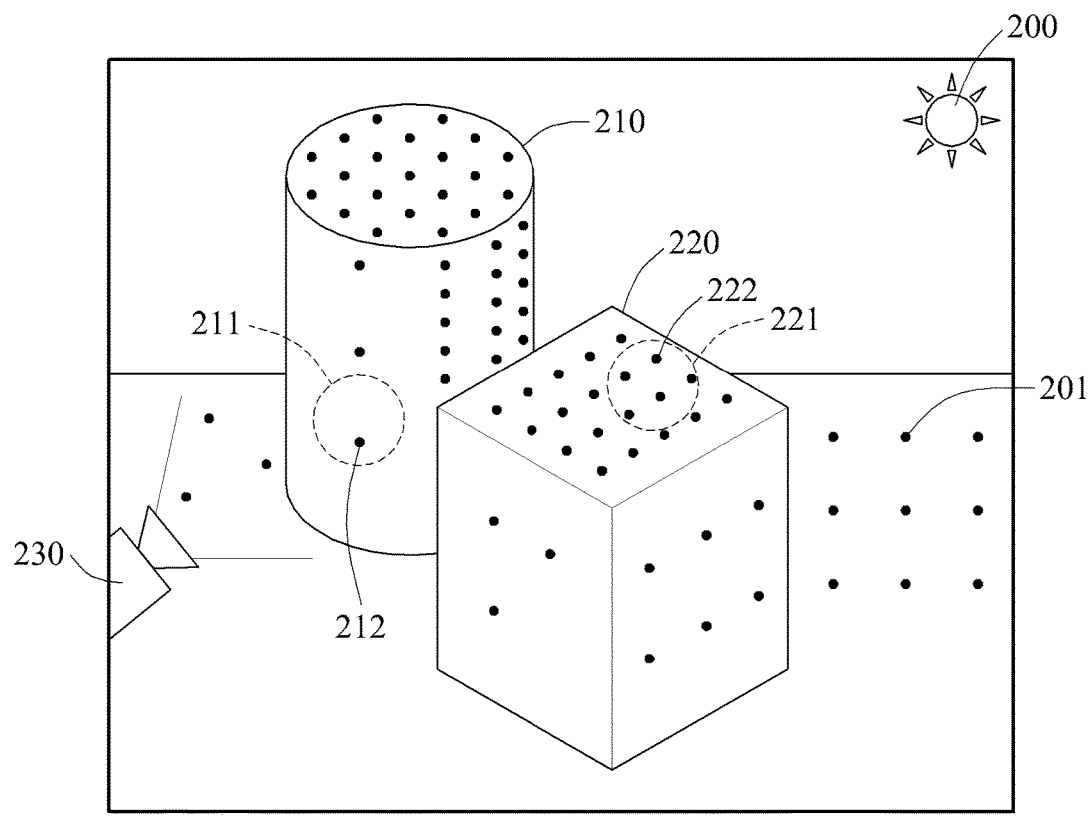
FIG. 2 illustrates an example of a three-dimensional (3D) model to be rendered and lights.

FIG. 2 illustrates an example of a 3D model to be rendered and lights.

Referring to FIG. 2, an object 210 and an object 220 are illustrated. A scene in which a 3D model is viewed from a rendering point of view 230 may be referred to as a screen space. In one example, such a screen space is divided into a plurality of tiles, and tile-based deferred rendering (TBDR) is performed. Such tile-based processing is advantageous to GPU acceleration through parallel processing. Sampled VPLs including VPLs 201, 212, and 222 are sampled based on a result of rendering a 3D model from a point of view of a direct light 200. VPLs are sampled relatively densely in a portion 221 visible from the point of view of the direct light 200, and are sampled relatively sparsely in a portion 211 invisible from the point of view of the direct light 200. In some cases, thousands to tens of thousands of such VPLs may be sampled. When light shading is performed in view of the VPLs, a computational complexity greatly increases. Thus, by decreasing a light shading resolution, light shading may be processed. Various examples will be described with reference to FIG. 3 and subsequent drawings.

Figure 3:
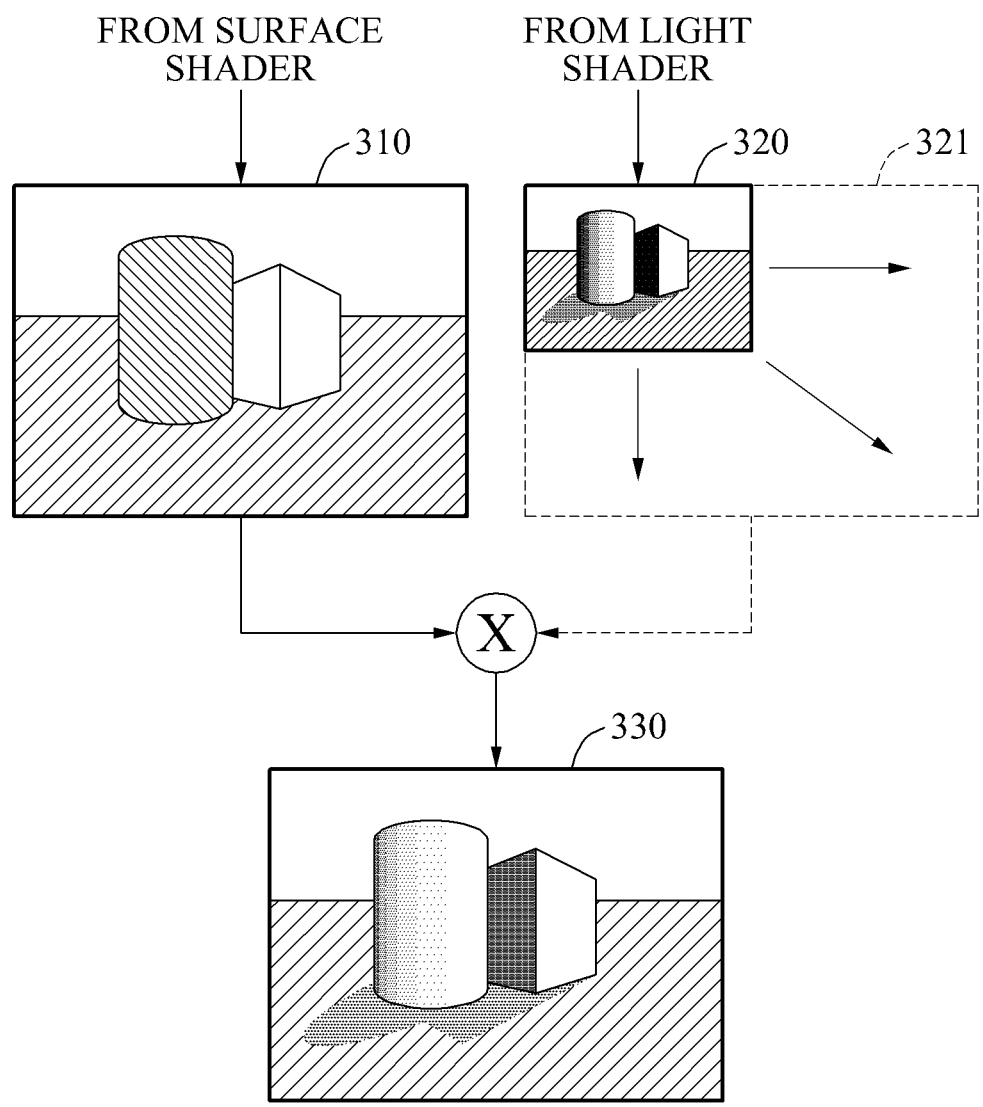
FIG. 3 illustrates an example of rendering.

FIG. 3 illustrates an example of rendering.

Referring to FIG. 3, a surface shading result 310 obtained from a surface shader has a relatively high resolution. For example, the resolution of the surface shading result 310 may be a full high-definition (FHD) resolution of 1920× 1080 pixels. A light shading result 320 obtained from a light shader has a resolution lower than the resolution of the surface shading result 310. For example, the resolution of the light shading result 320 may be a quarter high-definition (qHD) resolution of 960×540 pixels. Light diffuses smoothly and diffusively. Thus, the low resolution of the light shading result 320 is advantageous to upscaling since a quality of the light shading result 320 is less affected by an occurrence of an aliasing artifact.

As described above, a first resolution at which the light shader performs light shading may adaptively change. For example, a scene characteristic may be analyzed. The scene characteristic may include, for example, a complexity of a 3D model, a texture characteristic of an object of the 3D model, a mobility of an object between frames, a rate of change in a point of view of a camera used for rendering, an illumination of a scene, and a number of sampled VPLs. In a dynamic scene for which a rapid natural scene change is more important than a precise color expression, the light shading resolution decreases for rapid operation processing. Further, since a human eye detects an artifact caused by a difference in brightness in a dark area more quickly than in a bright area, the light shader decreases the light shading resolution in a bright scene more than in a dark scene. In addition, such processing may be performed based on a number of direct lights or a number of sampled VPLs. For example, since a computational complexity for a light shading operation increases as the number of sampled VPLs to be considered increases in a scene, the light shading resolution decreases.

In one example, rendering is TBDR. In this example, the resolution adjustment as described above may be performed for each tile or grid. A ratio of the surface shading resolution to the light shading resolution may be equally applied to all tiles, or characteristics of tiles may be analyzed and a ratio suitable for each individual tile may be applied. Through the foregoing process, a cell assignment efficiency of a parallel processing GPU may further increase.

The light shading result 320 provided at the low resolution by the light shader may be upscaled to an image 321 having a resolution equal to the resolution of the surface shading result 310. Such an upscaling process may be performed by a number of existing methods. Processing, for example, anti-aliasing, may be performed through interpolation. By multiplying the upscaled image 321 by the surface shading result 310, a resulting image 330 of global illumination rendering is generated.

Figure 4A:
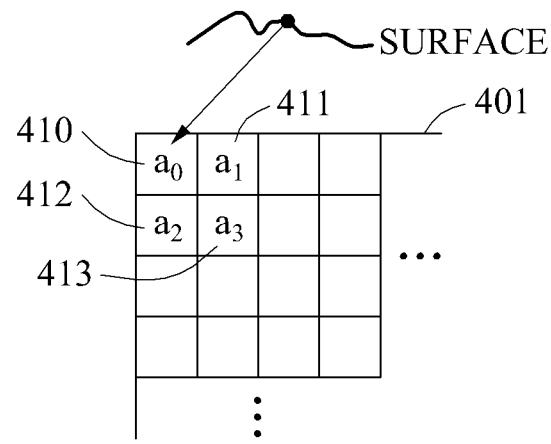
FIGS. 4A through 4C illustrate an example of a process of setting a surface shading resolution and a light shading resolution differently.
Figure 4B:
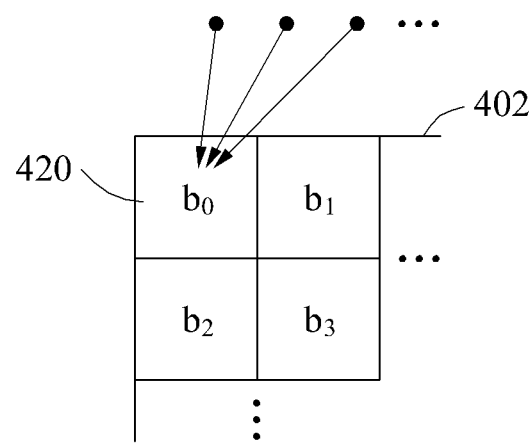
Figure 4C:
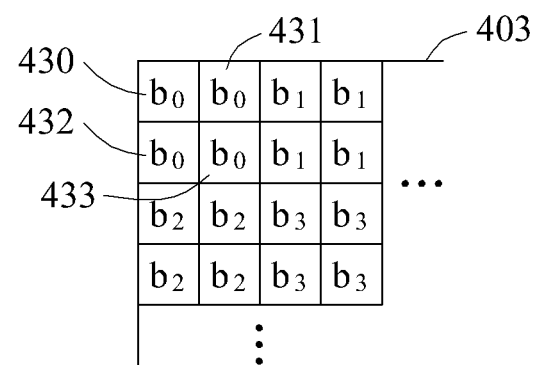

FIGS. 4A through 4C illustrate an example of a process of setting a surface shading resolution and a light shading resolution differently.

In FIG. 4A, surface shading is performed. Respective color values $a_0$, $a_1$, $a_2$, and $a_3$ of pixels 410, 411, 412, and 413 are determined based on a surface normal of a surface of an object, and a texture color. A corresponding result 401 is combined with a light shading result to generate a rendering image. In FIG. 4B, a light shading process is performed to generate a shading result including pixels having values $b_0$, $b_1$, $b_2$, and $b_3$. A pixel 420 is upscaled to correspond to the pixels 410, 411, 412, and 413 of FIG. 4A. The pixel 420 is a superpixel corresponding to the pixels 410, 411, 412, and 413 of FIG. 4A. A shading operation is performed on each VPL to be considered based on a color, a brightness, and a direction of the VPL.

FIG. 4C illustrates a result 403 of upscaling a light shading result 402 of FIG. 4B. A resolution is equalized to correspond to each of the pixels 410, 411, 412, and 413 of FIG. 4A. In this process, each of pixels 430, 431, 432, and 433 has a value $b_0$ equal to a value $b_0$ of the pixel 420 of FIG. 4B. In the foregoing process, appropriate post-processing may be performed to prevent aliasing.

Figure 5:
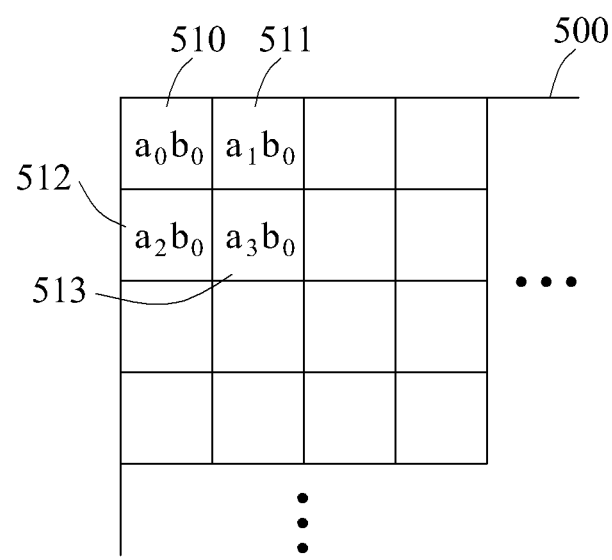
FIG. 5 illustrates an example of a process of performing rendering by combining a surface shading result with a light shading result.

FIG. 5 illustrates an example of a process of performing rendering by combining a surface shading result with a light shading result.

Referring to FIG. 5, a processor generates a resulting image 500 by combining a shading result of a surface shader, for example, the result 401 of FIG. 4A, with a result of upscaling a shading result of a light shader, for example, the result 403 of FIG. 4C. Through a pixel-by-pixel operation, a value $a_0 b_0$ of a pixel 510 is generated by multiplying the color value $a_0$ of the pixel 410 of FIG. 4A by the value $b_0$ of the pixel 430 of FIG. 4C. Similarly, color values $a_1 b_0$, $a_2 b_0$, and $a_3 b_0$ of other pixels 511, 512, and 513 are also calculated.

Figure 6:
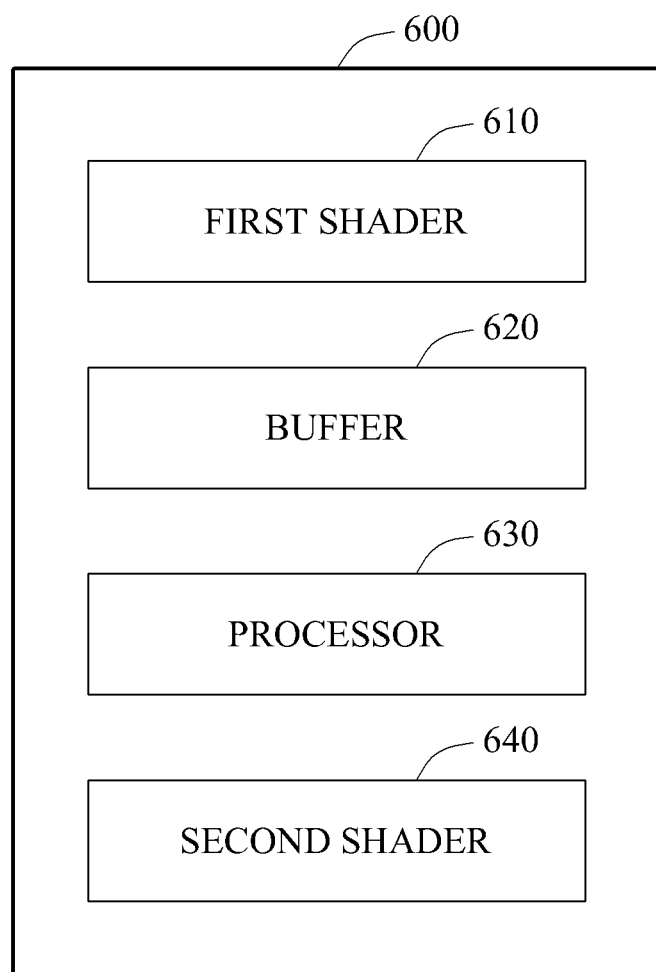
FIG. 6 is a block diagram illustrating another example of an image processing apparatus.

FIG. 6 is a block diagram illustrating another example of an image processing apparatus.

Referring to FIG. 6, an image processing apparatus 600 includes a first shader 610, a buffer 620, a processor 630, and a second shader 640. The first shader 610 performs light shading on a 3D model. The second shader 640 performs surface shading. In the example of FIG. 1, the light shading resolution is set to be lower than the surface shading resolution, which contributes to a reduction in a redundancy of a light shading operation using a spatial coherency. In the example of FIG. 6, a redundancy of a light shading operation is reduced using a temporal coherency, along with and/or in lieu of the example of FIG. 1. For example, when a result of the surface shading corresponds to an interlaced frame constituted by two fields, a result of the light shading may correspond to one of the two fields of the interlaced frame, and the light shading resolution may be half of the surface shading resolution. As is well known to one of ordinary skill in the art, one field of an interlaced frame constituted by two fields contains odd lines of the interlaced frame, and the other field of the interlaced frame contains even lines of the interlaced frame, and there is spatial coherency between a odd line in one field and an adjacent even line in the other field.

In one example, the first shader 610 that performs light shading omits performing light shading in some frames, rather than performing light shading in all frames. That is, the first shader performs light shading once in every N frames (N≥2). In the omitted frames, a light shading result of a neighboring frame is reused. For example, the second shader 640 performs surface shading at a predetermined number of frames per second (FPS), whereas the first shader 610 performs light shading at a rate lower than the predetermined FPS. For example, light shading may be performed in frames having odd frame indices, and corresponding results may be reused in frames having even frame indices. In detail, light shading may be performed at a relatively low FPS compared to surface shading. A ratio of the light shading FPS may vary. For example, the light shading FPS decreases in a dynamic scene for rapid operation processing. In a bright scene, the light shading FPS decreases. Further, in a section including a greater number of direct lights or sampled VPLs, the light shading FPS decreases. For the foregoing processing, the buffer 620 buffers a light shading result for a predetermined section. An adjustment of the light shading FPS is compatible with the example of the resolution adjustment described in FIG. 1. Thus, by adaptively adjusting the resolution while adjusting the FPS, computing resources may be used efficiently. That is, an amount of computing resources needed to perform the light shading operation at the reduced FPS will be less than an amount of computing resources needed to perform the light shading operation at the full FPS.

Along with or in lieu of setting a light shading FPS and a surface shading FPS differently, a result for a preceding frame may be reused for a light shading result. Reusing refers to, for example, adjusting light shading of a current frame based on light shading results of a predetermined number of preceding frames stored in the buffer 620. A light shading result for the current frame may be obtained by averaging light shading results of several preceding frames, calculating a weighted sum of light shading results of several preceding frames, or interpolating or extrapolating results of preceding frames. One example of interpolation is calculating a light shading result L(T) of a T-th frame using an equation $L(T)=(L(T-1)+L(T+1))/2$. On example of extrapolation is calculating a light shading result L(T) of a T-th frame using an equation $L(T)=L(T-1)+(L(T-1)-L(T-2))$. Through such processing, flickering due to a change in sampling of VPLs may be remarkably reduced. Further, in the weighted sum, by assigning a greater weight to a frame having a closer temporal index, that is, a frame closer in time to the current frame, a high-coherency result may be obtained. The processor 630 generates a rendering result image with respect to a scene by combining the light shading result with the surface shading result. The foregoing process will be described with reference to FIGS. 7 through 8B.

Figure 7:
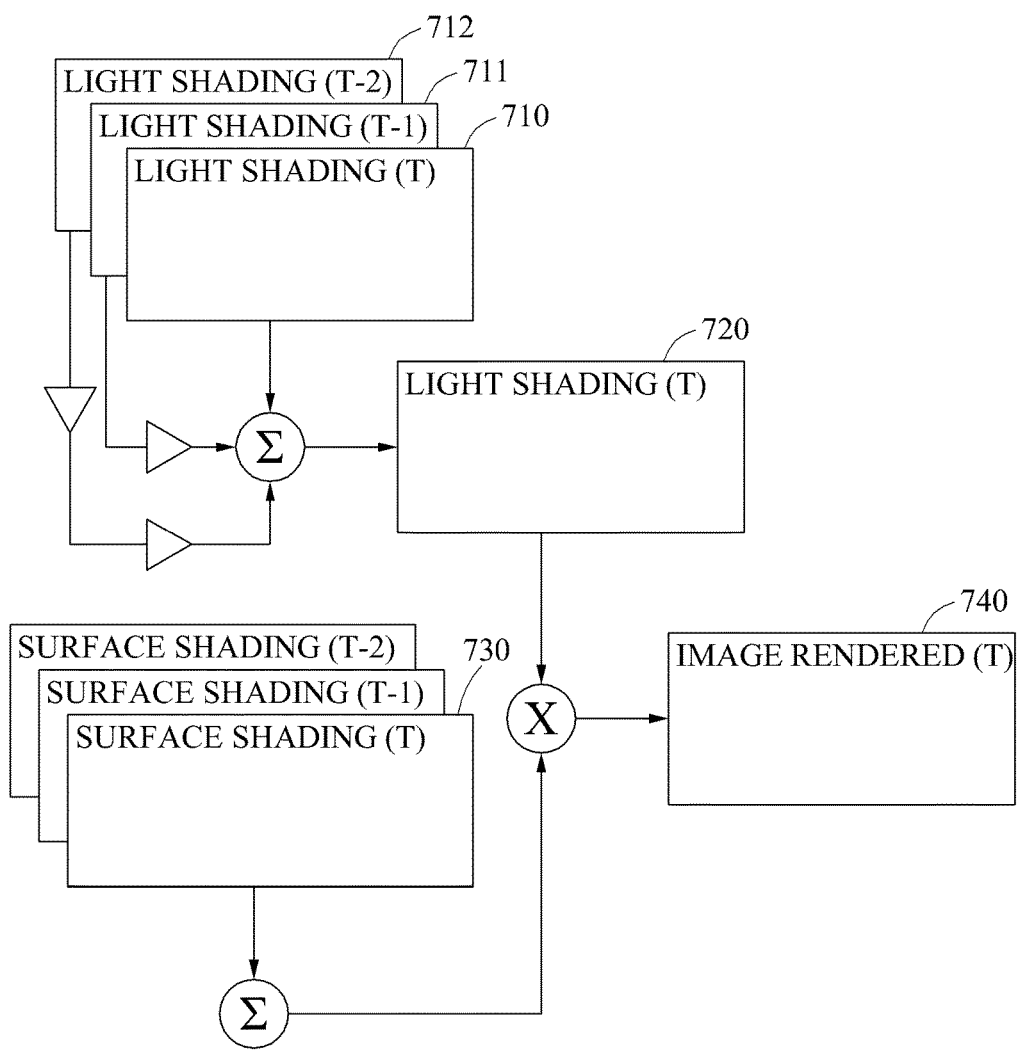
FIGS. 7 through 8B illustrate examples of a process of performing a light shading operation.
Figure 8A:
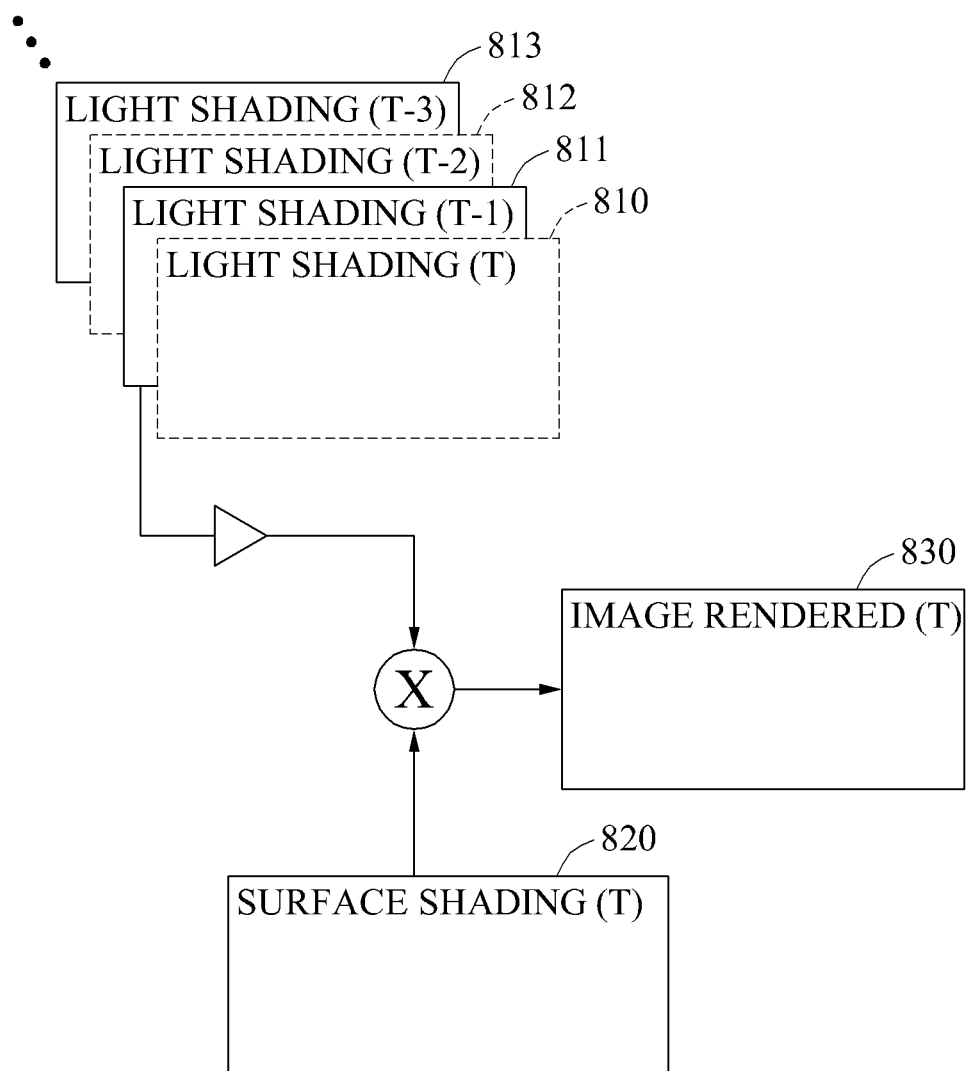
Figure 8B:
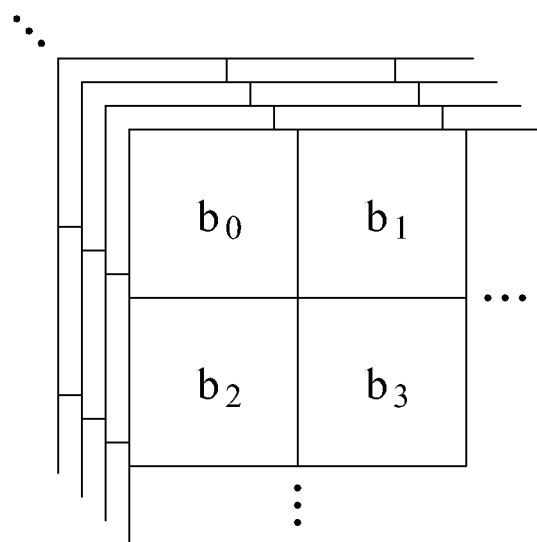

FIGS. 7 through 8B illustrate examples of a process of performing a light shading operation.

Referring to FIG. 7, light shading results of two frames preceding a current frame T are buffered. A light shading result 712 of a frame T−2 is delayed for two frames and input to an adder. A light shading result 711 of a frame T−1 is delayed for one frame and input to the adder. By calculating a weighted sum of the result 711, the result 712, and a light shading result 710 of the current frame T, a calibrated light shading result 720 to be used for the current frame T is generated. A processor acquires a resulting image 740 by combining a surface shading result 730 of the current frame T with the calibrated light shading result 720. Resolutions of the light shading results 710, 711, and 712 may be equal to a resolution of the surface shading result 730. However, in another example, the resolutions of the light shading results 710, 711, and 712 may be different from the resolution of the surface shading result 730. In this example, the calibrated light shading result 720 is a result that is upscaled after obtaining a weighted sum.

Referring to FIG. 8A, an example of performing light shading at a lower FPS compared to surface shading is shown. In this example, light shading is performed once in every two frames, that is, in every other frame. In detail, a light shading FPS is half of a surface shading FPS. A light shading result 813 of a frame T−3 is reused as a light shading result 812 of a frame T−2. Similarly, a light shading result 811 of a frame T−1 is reused as a light shading result 810 of a current frame T. The foregoing process may be implemented by delaying the light shading result 811 of the frame T−1 for one frame and combining the delayed light shading result 811 as the light shading result 810 of the current frame T with a surface shading result 820 of the current frame T. Through the combining, a resulting image 830 is generated. Resolutions of the light shading results 811 and 813 may be the same as a resolution of the surface shading result 820. However, in another example, the resolutions of the light shading results 811 and 813 may be different from the resolution of the surface shading result 820. In this example, before a multiplication process performed by the processor, the light shading results are upscaled.

In the example of FIG. 8A, a ratio of the light shading FPS to the surface shading FPS is 1:2. However, the ratio may be set differently. The ratio may change based on a scene characteristic, rather than being set and maintained at one value. In examples described above, the ratio of the light shading FPS decreases in a dynamic scene more than in a static scene, and in a bright scene more than in a dark scene. Further, in another example, the FPS ratio varies depending on a number of sampled VPLs as described above.

In another example, light shading per frame may be performed by grouping pixels and sequentially updating pixels in a group in different frames. More specifically, the pixels of each frame are grouped into groups of N pixels (N≥2), and the N pixels are sequentially updated in N frames so that a different one of the N pixels is updated in each of the N frames. Referring to FIG. 8B, pixels subject to light shading with respect to a plurality of frames are illustrated. In this example, four adjacent pixels $b_0$, $b_1$, $b_2$, and $b_3$ are grouped to form a single group. In a frame T−3, a light shading operation is performed with respect to the pixel $b_0$. A light shading result of the pixel $b_0$ is reused in subsequent frames corresponding to a number of the pixels in the group. For example, the light shading operation is actually performed with respect to the pixel $b_0$ in the frame T−3, and a corresponding result is reused in a frame T−2, a frame T−1, and a frame T. A new light shading operation with respect to the pixel $b_0$ is performed in a frame T+1. Similarly, the light shading operation is performed with respect to the pixel $b_1$ in the frame T−2, and a corresponding result is reused in the frame T−1, the frame T, and the frame T+1. The light shading operation is performed with respect to the pixel $b_2$ in the frame T−1, and a corresponding result is reused in the frame T, the frame T+1, and a frame T+2. Further, the light shading operation is performed with respect to the pixel $b_3$ in the frame T, and a corresponding result is reused in the frame T+1, the frame T+2, and a frame T+3. A new light shading operation with respect to the pixel $b_3$ is performed in a frame T+4. That is, the light shading operation is performed once in every four frames with respect to each individual pixel. Thus, a pixel update rate of the light shading result with respect to each individual pixel is once every four frames. In contrast, the surface shading operation is performed in every frame with respect to each individual pixel. Thus, a pixel update rate of the light shading result is lower than a pixel update rate of the surface shading result.

Figure 9:
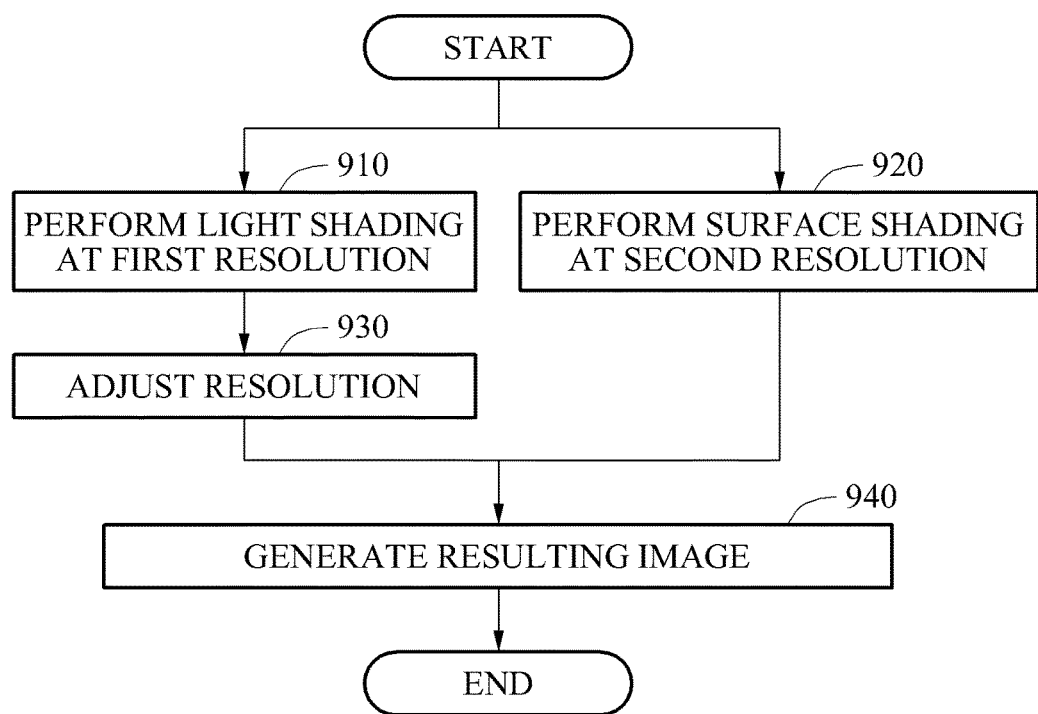
FIGS. 9 and 10 are flowcharts illustrating examples of an image processing method.
Figure 10:
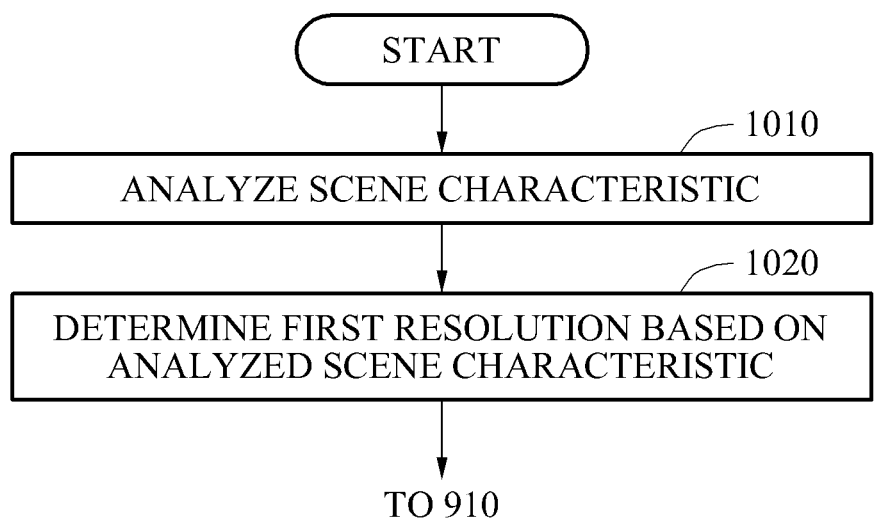

FIGS. 9 and 10 are flowcharts illustrating examples of an image processing method.

Referring to FIG. 9, in operation 910, a light shader performs light shading on a 3D model at a first resolution. In the light shading, processing requiring a great computational complexity, for example, a visibility check, may be performed on a number of direct lights and/or VPLs based on colors, brightnesses, and directions. However, in this example, by decreasing a light shading resolution and/or a light shading FPS, the computational complexity may be reduced. In operation 920, a surface shader performs surface shading on the 3D model at a second resolution. For example, the first resolution corresponding to a light shading resolution may be a half resolution or a quarter resolution of the second resolution corresponding to a surface shading resolution. When the first resolution differs from the second resolution, the resolution is adjusted in operation 930. The description of FIG. 3 is also applicable to the difference in resolution, and the descriptions of FIGS. 4B and 4C are also applicable to the resolution adjustment.

In operation 940, a processor generates a resulting image by combining a surface shading result generated in operation 920 with a resolution-adjusted light shading result generated in operations 910 and 920. The descriptions provided with reference to FIGS. 1 through 5 are also applicable to the foregoing process. Thus, duplicated descriptions will be omitted for conciseness.

Referring to FIG. 10, an example of reflecting a scene characteristic in an adjustment of a light shading resolution and/or a light shading FPS will be described. In operation 1010, a scene characteristic is analyzed. In addition to the analyzing of the scene characteristic, other factors, for example, a VPL sampling state, may be analyzed together. For example, whether a scene is a dynamic scene or a static scene, whether an overall brightness of a scene is high or low, or a number of sampled VPLs, may be analyzed as the scene characteristic. In operation 1020, a first resolution at which light shading is to be performed is determined based on the analyzed scene characteristic. For example, but not limited thereto, in relation to the scene characteristic, the first resolution is determined to be a lower value in a dynamic scene than in a static scene. Further, the first resolution is determined to be a lower value in a bright scene than in a dark scene. In addition, as described above, the first resolution is determined to be a lower value in a scene including a greater number of sampled VPLs.

Although not shown in FIG. 10, in addition to or in lieu of the resolution adjustment, an operation of adjusting a light shading FPS may be performed. For example, based on the scene characteristic analyzed in operation 1010, the light shading FPS is adjusted to be a lower value in a dynamic scene than in a static scene, and in a bright scene than in a dark scene. Further, as a greater number of VPLs are sampled, the light shading FPS is determined to be a lower value. The descriptions provided with reference to FIGS. 1 through 8B are also applicable to the example of FIG. 10. Thus, duplicated descriptions will be omitted for conciseness.

The first shaders 110 and 610, the second shaders 120 and 640, the processors 130 and 630, and the buffer 620 in FIGS. 1 and 6 that perform the operations described herein with respect to FIGS. 1-10 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9 and 10 that perform the operations described herein with respect to FIGS. 1-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising: a processor configured to create a set of N frames, wherein N>2 and is selected based on a characteristic of a scene; perform a light shading operation associated with a light source on a three-dimensional (3D) model of the scene in a first frame of the set of N frames to obtain a first light shading result of the first frame; assign the light shading result to remaining frames of the set of N frames; perform a surface shading operation on the 3D model in every frame of the set of N frames to obtain a respective surface shading result of each respective frame of the set of N frames; and generate a rendering result of each frame in the set of N frames by combining the respective surface shading result of each respective frame of the set of N frames with the respective light shading result of the each respective frame.

2. The apparatus of claim 1, wherein the processor is further configured to: upscale the superpixel light shading result having the first resolution to have a resolution equal to the second resolution to obtain an upscaled superpixel light shading result; and generate the rendering result of a pixel of the N pixels by combining the upscaled superpixel light shading result with the respective surface shading result of the pixel.

3. The apparatus of claim 1, wherein the processor is further configured to decrease the first resolution in a dynamic scene more than in a static scene.

4. The apparatus of claim 1, wherein the processor is further configured to decrease the first resolution in a first scene with a high brightness relative to a second scene with a low brightness relative to the first scene more than in the second scene.

5. The apparatus of claim 1, wherein the processor is further configured to: consider indirect lights in the performing of the light shading operation; and decrease the first resolution as a number of indirect lights considered in the light shading operation increases.

6. The apparatus of claim 1, wherein the processor is further configured to: perform the light shading operation at a first resolution; and perform the surface shading operation at a second resolution different from the first resolution.

7. The apparatus of claim 6, wherein the first resolution is lower than the second resolution.

8. An image processing apparatus comprising: a processor configured to create a set of N frames, wherein N>2; divide each frame of the set of N frames into groups of N pixels; create light shading results of respective frames in the set of N frames by performing a light shading operation associated with at least one light source on a three-dimensional (3D) model in every frame of the set of N frames and for every group of N pixels in a respective frame of the set of N frames, such that a single pixel in each group of N pixels is updated during the light shading operation of the respective frame, and non-updated pixels of each group of N pixels reuse respective light shading results of a previous frame during the light shading operation of the respective frame; perform a surface shading operation on the 3D model in every frame of the set of N frames to obtain surface shading results for respective frames of the set of N frames; and generate a rendering result of each frame in the set of N frames by combining the surface shading result of the respective frame with the light shading result of the respective frame.

9. The apparatus of claim 8, wherein the processor is further configured to: perform the light shading operation at a first resolution; and perform the surface shading operation at a second resolution different from the first resolution.

10. The apparatus of claim 8, wherein the processor is further configured to perform the light shading operation for the pixels in each of the groups of N pixels sequentially in successive frames such that the light shading operation is performed for a different one of the pixels in each of the groups of N pixels in each of the successive frames.

11. The apparatus of claim 10, wherein the processor is further configured to reuse a light shading result of a previous frame for each pixel in each of the groups of N pixels for which the light shading operation is not performed in each of the successive frames.

12. The apparatus of claim 9, wherein the processor is further configured to: adjust the light shading result of the first resolution to have a resolution equal to the second resolution to obtain an adjusted light shading result; and generate the rendering result of the respective frame by combining the adjusted light shading result of the respective frame with the surface shading result of the respective frame.

13. The apparatus of claim 9, wherein the processor is further configured to: analyze a characteristic of a scene to be rendered; and adaptively adjust the first resolution based on the analyzed characteristic of the scene.

14. The apparatus of claim 13, wherein the characteristic of the scene is an inter-frame difference; and the processor is further configured to adjust the first resolution by decreasing the first resolution in a dynamic scene more than in a static scene based on the analyzed inter-frame difference.

15. The apparatus of claim 13, wherein the characteristic of the scene is a scene brightness; and the processor is further configured to adjust the first resolution by decreasing the first resolution in a scene with a relatively high brightness more than in a scene with a relatively low brightness based on the analyzed scene brightness.

16. The apparatus of claim 13, wherein processor is further configured to consider indirect lights in the performing of the light shading operation; the characteristic of the scene is a number of indirect lights considered in the performing of the light shading operation; and the processor is further configured to adjust the first resolution by decreasing the first resolution as the number of indirect lights considered in the performing of the light shading operation increases based on the analyzed number of indirect lights.

17. An image processing apparatus comprising: a processor configured to obtain a set of N pixels of a three-dimensional (3D) model; perform a surface shading operation for every pixel of the set of N pixels to obtain a respective surface shading result for each pixel of the set of N pixels; group the N pixels into a superpixel; perform a light shading operation on the superpixel to obtain a superpixel light shading result of the superpixel; upscale the superpixel by dividing the superpixel into the N pixels and assigning the superpixel light shading result to each pixel of the N pixels to create a respective light shading result for each respective pixel of the set of N pixels; and generate a rendering result for each pixel of the set of N pixels by combining the respective assigned light shading result of a respective pixel with the respective surface shading result of the respective pixel.

18. The apparatus of claim 17, wherein an amount of computing resources needed by the processor to perform the light shading operation to obtain the superpixel light shading result is less than an amount of computing resources that would be needed by the processor to perform the light shading operation to obtain a light shading result of each pixel in the set of N pixels.

19. The apparatus of claim 17, wherein the processor is further configured to: perform the light shading operation on the 3D model based on a first resolution to produce the superpixel light shading result, the superpixel light shading result having the first resolution; and perform the surface shading operation on the 3D model based on a second resolution greater than the first resolution to produce the respective surface shading results of each pixel of the set of N pixels, the respective surface shading results having the second resolution.

20. The apparatus of claim 1, wherein the processor is further configured to: perform the light shading operation on the 3D model based on a first frame rate to produce the light shading result, the light shading result having the first frame rate; and perform the surface shading operation on the 3D model based on a second frame rate greater than the first frame rate to produce the surface shading result, the surface light shading result having the second frame rate.

21. An image processing method of an image processing apparatus comprising at least one processor, the method comprising: creating a set of N frames, wherein N 2 and is selected based on a characteristic of a scene; performing a light shading operation associated with a light source on a three-dimensional (3D) model of the scene in a first frame of the set of N frames to obtain a light shading result of the first frame; assigning the light shading result to remaining frames of the set of N frames; performing a surface shading operation on the 3D model in every frame of the set of N frames to obtain a respective surface shading result of each respective frame of the set of N frames; and generating a rendering result of each frame in the set of N frames by combining the respective surface shading result of each respective frame of the set of N frames with the respective light shading result of the each respective frame.

22. An image processing method of an image processing apparatus comprising at least one processor, the method comprising: creating a set of N frames, wherein N>2; dividing each frame of the set of N frames into groups of N pixels; creating light shading results of respective frames in the set of N frames by performing a light shading operation associated with at least one light source on a three-dimensional (3D) model in every frame of the set of N frames and for every group of N pixels in a respective frame of the set of N frames, such that a single pixel in each group of N pixels is updated during the light shading operation of the respective frame, and non-updated pixels of each group of N pixels reuse respective light shading results of a previous frame during the light shading operation of the respective frame; performing a surface shading operation on the 3D model in every frame of the set of N frames to obtain surface shading results for respective frames of the set of N frames; and generating a rendering result of each frame in the set of N frames by combining the surface shading result of the respective frame with the light shading result of the respective frame.

23. An image processing method of an image processing apparatus comprising at least one processor, the method comprising: obtaining a set of N pixels of a three-dimensional (3D) model; performing a surface shading operation for every pixel of the set of N pixels to obtain a respective surface shading result for each pixel of the set of N pixels; grouping the N pixels into a superpixel; performing a light shading operation on the superpixel to obtain a superpixel light shading result of the superpixel; upscaling the superpixel by dividing the superpixel into the N pixels and assigning the superpixel light shading result to each pixel of the N pixels, to create a respective light shading result for each respective pixel of the set of N pixels; and generating a rendering result for each pixel of the set of N pixels by combining the respective assigned light shading result of a respective pixel with the respective surface shading result of the respective pixel.

24. The apparatus of claim 1, wherein N is selected based on any one or any combination of any two or more of a brightness of the scene, a number of indirect lights of the scene, or an amount of movement of the scene.

25. The apparatus of claim 17, wherein the combining of the respective light shading result of the respective pixel with the respective surface shading result of the respective pixel comprises multiplying the respective light shading result and the respective surface shading result.

* * * * *